(12) United States Patent
Eskerud

(10) Patent No.: US 7,800,042 B2
(45) Date of Patent: *Sep. 21, 2010

(54) METHOD AND APPARATUS FOR SETTING BLACK LEVEL IN AN IMAGER USING BOTH OPTICALLY BLACK AND TIED PIXELS

(75) Inventor: Erik Eskerud, Drammen (NO)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/222,857

(22) Filed: Aug. 18, 2008

(65) Prior Publication Data

US 2008/0315073 A1 Dec. 25, 2008

Related U.S. Application Data

(63) Continuation of application No. 11/302,124, filed on Dec. 14, 2005, now Pat. No. 7,427,735.

(51) Int. Cl.
*H01L 27/00* (2006.01)
*A47G 29/02* (2006.01)

(52) U.S. Cl. .................... 250/208.1; 348/241

(58) Field of Classification Search ............ 250/208.1; 348/241, 243, 245
See application file for complete search history.

(56) References Cited

U.S. PATENT DOCUMENTS

| 5,471,515 | A | 11/1995 | Fossum et al. |
| 6,473,124 | B1 | 10/2002 | Panicacci et al. |
| 6,522,355 | B1 | 2/2003 | Hynecek et al. |
| 6,529,242 | B1 | 3/2003 | Panicacci |
| 6,791,619 | B1 | 9/2004 | Misawa |
| 7,427,735 | B2 * | 9/2008 | Eskerud .......... 250/208.1 |
| 2003/0052982 | A1 | 3/2003 | Chieh |
| 2003/0184666 | A1 | 10/2003 | Jo |
| 2005/0237402 | A1 | 10/2005 | Sase et al. |
| 2005/0243193 | A1 | 11/2005 | Gove et al. |
| 2006/0012838 | A1 | 1/2006 | Ovsiannikov |

FOREIGN PATENT DOCUMENTS

JP 2003134400 A 5/2003

* cited by examiner

*Primary Examiner*—Thanh X Luu
(74) *Attorney, Agent, or Firm*—Dickstein Shapiro LLP

(57) ABSTRACT

An imaging pixel array includes an active area of pixels, organized into rows and columns of pixels. The array also includes a plurality of dark pixel columns adjacent to the active area of pixels such that rows of pixels in the active area of pixels extend across the plurality of dark pixel columns. The plurality of dark pixel columns are composed of tied pixels. The array also includes a plurality of dark pixel rows adjacent to the active area of pixels and the plurality of dark pixel columns such that columns of pixels in the active area of pixels extend across the plurality of dark pixel rows. The plurality of dark pixel rows are composed of both optically black pixels and tied pixels on the same row.

11 Claims, 5 Drawing Sheets

METHOD AND APPARATUS FOR SETTING BLACK LEVEL IN AN IMAGER USING BOTH OPTICALLY BLACK AND TIED PIXELS

CROSS-REFERENCE TO RELATED APPLICATIONS

This application is a continuation of U.S. patent application Ser. No. 11/302,124, filed on Dec. 14, 2005, now U.S. Pat. No. 7,427,735 the subject matter of which is incorporated in its entirety by reference herein.

FIELD OF THE INVENTION

The present invention relates generally to semiconductor imagers. More specifically, the present invention relates to noise reduction and suppression of unwanted artifacts in semiconductor imagers.

BACKGROUND OF THE INVENTION

Complementary metal-oxide semiconductor (CMOS) image sensors utilize sensor arrays that are composed of rows and columns of pixels. The pixels are sensitive to light of various wavelengths. When a pixel is subjected to a wavelength of light to which the pixel is sensitive, the pixel generates electrical charge that represents the intensity of the sensed light. When each pixel in the sensor array outputs electrical charge based on the light sensed by the array, the combined electrical charges represent the image projected upon the array. Thus, CMOS image sensors are capable of translating an image of light into electrical signals that may be used, for example, to create digital images.

Ideally, the digital images created through the use of CMOS image sensors are exact duplications of the light image projected upon the sensor arrays. However, various noise sources can affect individual pixel outputs and thus distort the resulting digital image. Some noise sources may affect the entire sensor array, thereby requiring frame-wide correction of the pixel output from the array. One such corrective measure applied to the output of the entire sensor array is the setting of a base-line black level (described below). Other noise sources may only affect specific portions of the sensor array. For example, row-specific noise may be generated from a mismatch of circuit structures in the image sensors due to variations in the manufacturing processes of integrated circuits. The effect of row-specific noise in an image sensor is that rows or groups of rows may exhibit relatively different outputs in response to uniform input light.

In order to set a corrective black level and remove the effects of row-specific noise, dark rows and dark columns are used in image sensors, as demonstrated in FIG. 1. FIG. 1 show an image sensor 100 that includes a pixel array 110 organized into N pixel columns and R pixel rows. The pixel array 110 contains an active area 112, dark rows 115 and dark columns 117. Although not shown in FIG. 1, dark rows 115 may also be located above the active area 112, and dark columns 117 may also be located to the left of the active area 112. Upon readout of a row, parallel pixel outputs from each column (i.e., N pixel outputs) are sampled and stored on a set of capacitors 120, one row at a time. Each pixel is in turn sent through an analog signal processing block 130 before being digitized by an analog-to-digital converter 140. The stream of digitized pixels are then processed digitally (block 150) before they are sent to an output buffer 170. By monitoring the digitized data from the dark rows 115, a feedback loop 160 is used to adjust the frame-wise black level. Generally, noise reducing processes (block 150) are applied to each pixel output, sequentially, either before or after the output reaches the analog-to-digital converters 140.

Dark columns 117 and dark rows 115 are areas within the pixel array 110 that do not receive light or capture image data. Pixel outputs from the dark rows 115 and dark columns 117 are used to both set the black level for the entire pixel array 110 and correct row-specific noise.

One corrective technique is to ensure that pixels in the dark columns 117 and dark rows 115 do not receive image data by covering the pixels in the dark columns 117 and dark rows 115 with a metal plate. Pixels blocked from sensing light via a metal plate are referred to as optically black pixels. Because, theoretically, no light is sensed by the optically black pixels, the only charge generated by the optically black pixels is internal noise-induced charge. This is often referred to as dark current. Thus, one method of compensating for noise is through the calculation of average optically black pixel output values, which represent average noise values, and then subtracting these average values from the outputs of the pixels in the active area 112. For example, an appropriate black level may be set by calculating an average optically black pixel output for the optically black pixels in the dark rows 115 (block 150), and then subtracting this average value from the output of every pixel in the active area 112 and dark columns 117. Row-specific noise in pixel array 110 may also be compensated for by calculating an average optically black pixel output for each row of optically black pixels in the dark columns 117 (block 150). The calculated optically black pixel average for each row is then subtracted from the values of each of the active pixels in the corresponding rows of pixels.

In practice, because each row of pixel outputs in the pixel array 110 is read-out sequentially, the pixel outputs from the dark rows 115 are read first. From the dark rows 115, the optically black blacklevel is calculated (block 150) and then applied to the successive pixel outputs from the active area 112 and the dark columns 117. Row-specific noise is then corrected by using the already adjusted optically black pixel output values from the dark columns 117. The output values of the optically black pixels for a given row in the dark columns 117 are averaged (block 150), and then the averaged optically black pixel output is subtracted from the output of each of the pixels within the respective row of the active area 112.

A drawback with using optically black pixels in calculating a black level value is that optically black pixels are sensitive to more than just background or internal noise. Optically black pixels may generate charge in response to random, localized noise sources, thus artificially altering the calculated black level. For example, optically black pixels may generate excess charge as a result of pixel blooming. Blooming is caused when too much light enters a pixel, thus saturating the pixel. A pixel subject to blooming is unable to hold all of the charge generated as a result of sensed light. Consequently, any excess charge may leak from the pixel and contaminate adjacent pixels. Optically black pixels that generate excess charge as a result of blooming will result in an artificially high black level. Infrared (IR) reflections may also result in excess charge generation. IR reflections occur when IR radiation is incident on pixels within the pixel array 110 and is trapped within the image sensor 100. The IR radiation, which also causes pixels to generate charge, may repeatedly reflect against multiple optically black pixels, thus again artificially inflating the amount of generated charge. In these cases, the black level sensed by the optically black pixels is generally higher than the ideal black level because of the charge collected from these noise sources.

In response to the disadvantages of using optically black pixels to set the black level value, an alternative technique for correcting noise in a pixel array 110 is to tie the photodiode of the pixels in the dark rows 115 to a fixed voltage. The fixed voltage is, in essence, a fixed black level for the pixel array 110. The advantages of this method is that the black level calculation is not influenced by blooming, IR reflections, etc., and that every frame utilizes a constant and unchanging black level. However, tied pixels are not sensitive to any changes in dark current or other row-specific noise sources. Thus, a black level generated utilizing tied pixels may not accurately compensate for the noise caused by dark current.

There is, therefore, a need and desire for a method and apparatus for efficiently generating and applying a stable black level value utilizing the benefits of tied pixels and optically black pixels to the pixel outputs of a solid state imager, for example, a CMOS imager.

BRIEF SUMMARY OF THE INVENTION

An imaging pixel array is provided, that includes an active area of pixels, organized into rows and columns of pixels. The array also includes a plurality of dark pixel columns adjacent to the active area of pixels such that rows of pixels in the active area of pixels extend across the plurality of dark pixel columns. The plurality of dark pixel columns are composed of tied pixels. The array also includes a plurality of dark pixel rows adjacent to the active area of pixels and the plurality of dark pixel columns such that columns of pixels in the active area of pixels extend across the plurality of dark pixel rows. The plurality of dark pixel rows are composed of both optically black pixels and tied pixels.

Similarly, an apparatus for providing pixel correction values for an imager is provided, as well as a method to provide the pixel correction values for the imager. Both the apparatus and method utilize a pixel array that is composed of an active area, a plurality of dark pixel columns and a plurality of dark pixel rows. The plurality of dark pixel columns are composed of tied pixels while the plurality of dark pixel rows are composed of a both optically black pixels and tied pixels.

An imager and an imaging system are further provided, both utilizing a pixel array that is composed of an active area, a plurality of dark pixel columns and a plurality of dark pixel rows. The plurality of dark pixel columns are composed of tied pixels while the plurality of dark pixel rows are composed of a both optically black pixels and tied pixels.

DETAILED DESCRIPTION OF THE INVENTION

Figure 1:
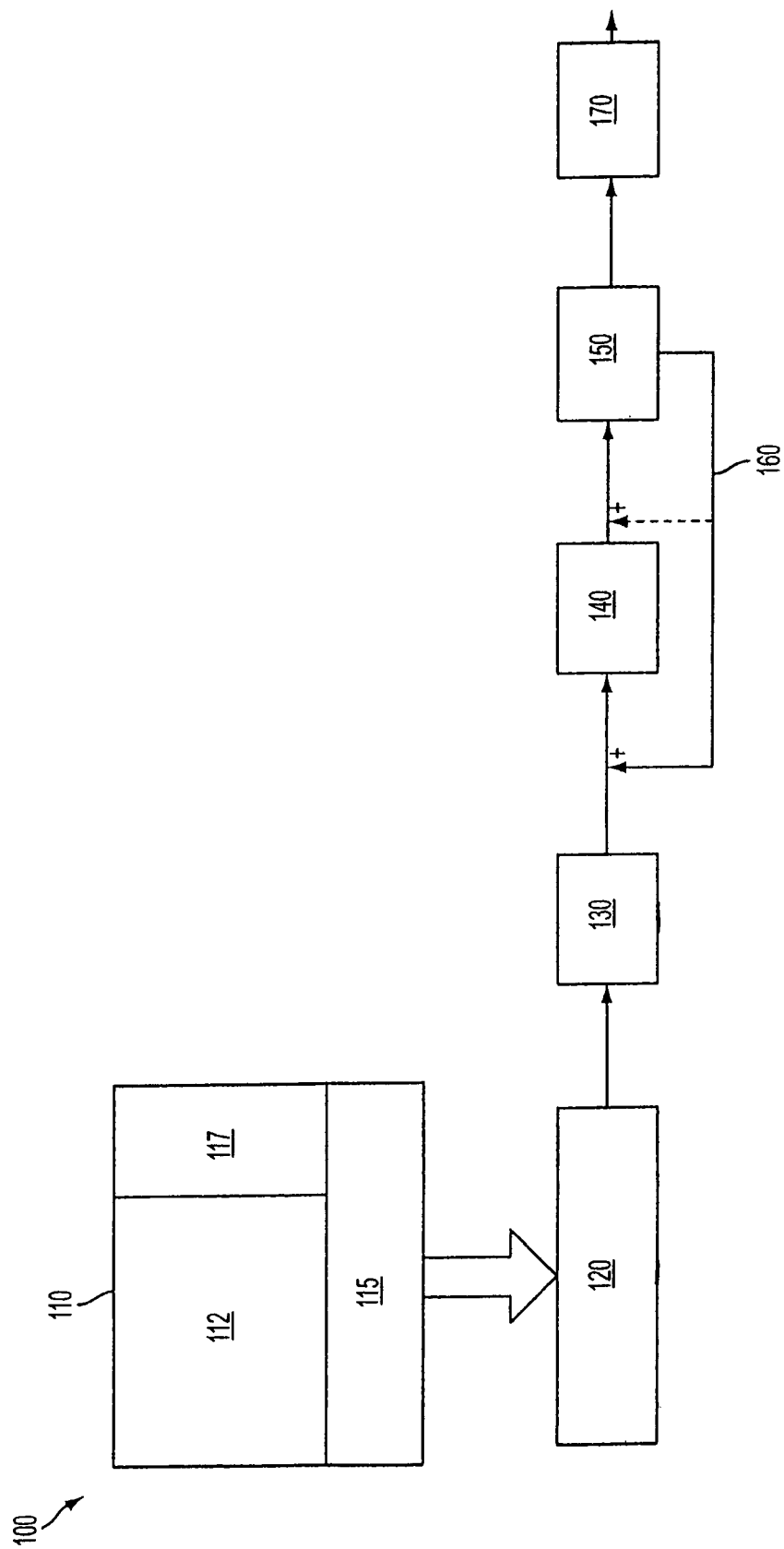
FIG. 1 is an image sensor.
Figure 2:
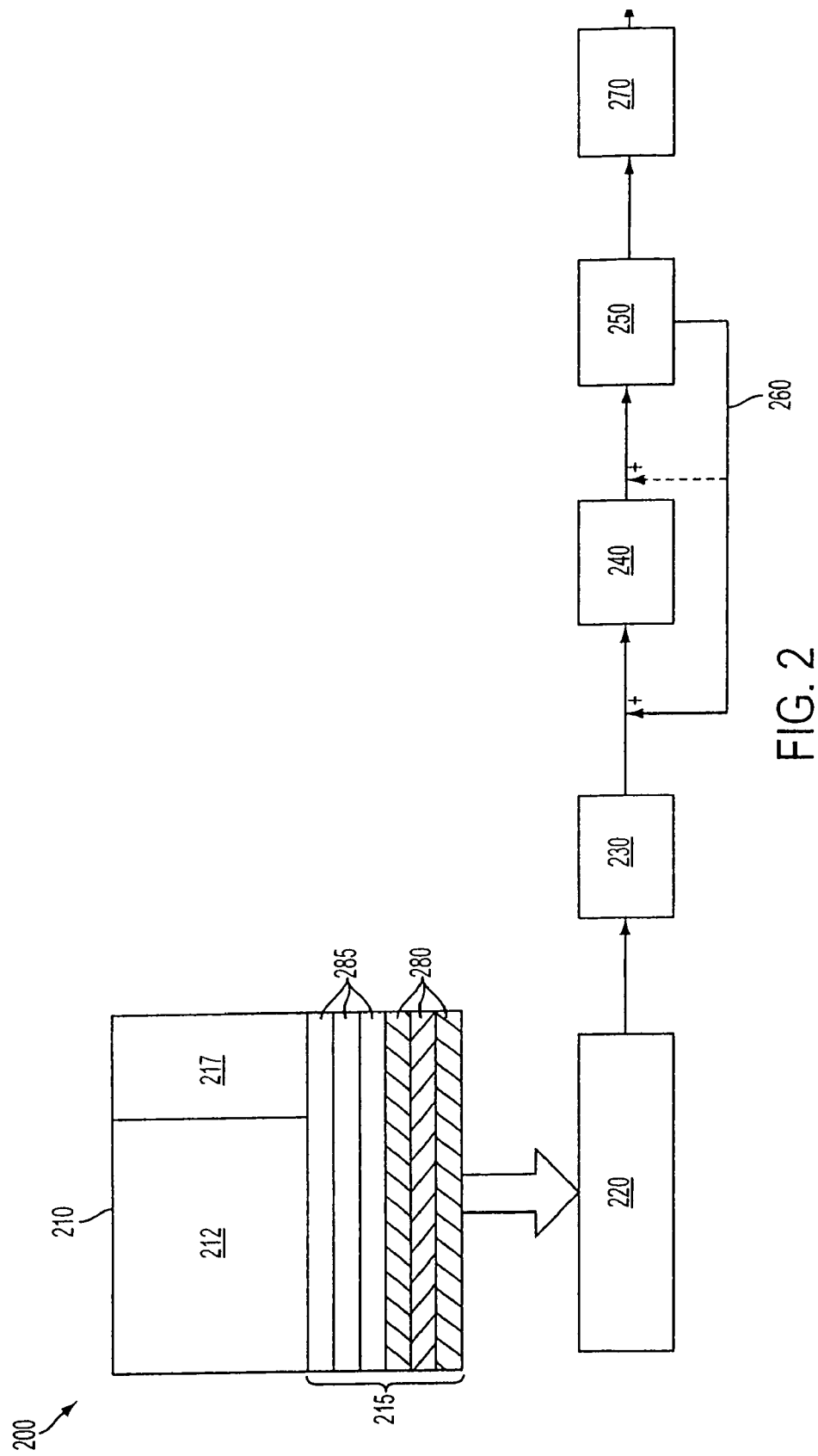
FIG. 2 is an image sensor according to an exemplary embodiment of the invention.

In one exemplary embodiment of the invention, an image sensor utilizes both tied and optically black pixels to calculate a stable black level value for generated images. FIG. 2 demonstrates an image sensor 200, e.g., a CMOS image sensor, that includes a pixel array 210, a set of holding capacitors 220, an analog signal processing block 230, a set of analog-to-digital converters 240, a set of read-out buffers 270, a black level correction circuit 250 and a feedback loop 260. The pixel array 210 includes an active area 212, dark rows 215 and dark columns 217. Within the dark rows 215 are rows 285 of optically black pixels (i.e., optically black pixel rows 285) and rows 280 of tied pixels (i.e., tied pixel rows 280). Only tied pixels are in the dark columns 217. Because the tied pixel rows 280 are not sensitive to dark current, the output levels of the optically black pixel rows 285 and tied pixel rows 280 will vary. The variance between optically black and tied pixel outputs may be compensated for by calculating the difference in readout levels between the optically black pixel rows 285 and the tied pixel rows 280 (black level correction circuit 250) and then applying the calculated difference as an additional black level correction value to the whole frame (feedback loop 260). For example, circuit 250 could calculate an average optically black pixel output or tied pixel output for each row of the dark rows 215. An average optically black pixel output could then be calculated for all optically black pixel rows 285 in the dark rows 215, and an average tied pixel output could be calculated for all tied pixel rows 280 in the dark rows 215. Finally, the difference between the average optically black pixel output and the average tied pixel output could be calculated. The calculated difference between the average tied pixel output and the average optically black pixel output is applied as a black level correction value (feedback loop 260).

However, errors may arise when comparing pixel outputs from different rows. When a row with either optically black or tied pixels is sampled and then average values are calculated for each row, the values are affected by row-specific noise. The uncertainty introduced by row-specific noise can be overcome by averaging pixel outputs from a sufficient number of multiple optically black pixel rows 285, and then finding the difference between this more accurate average optically black pixel output value and an averaged output from a sufficient number of tied pixel rows 280. To effectively average out any row-specific noise, however, approximately thirty-two rows per pixel color must be sampled. The averaging over thirty-two rows can be accomplished by averaging a single row sample over thirty-two frames, although a drawback to this method is that when new gain settings are applied to the sensor, a user must wait for thirty-two frames before a new correction factor based on the new gain setting is generated. A preferable method is to establish the correction value during readout of the dark rows so that a new correction factor is computed before the first active row is read out. This, of course, suggests the necessity of introducing thirty-two physical dark rows to be read and averaged and then compared with the tied pixel output, thus obtaining a reliable value for the black level average for the given gain and integration time of the imager. However, the large number of necessary dark rows is undesirable. Not only does the large number of dark rows 215 affect the area of the pixel array 210 by increasing the array's size and expense, but the increase in rows also affects the frame rate of the imager, since read-out of each frame will take longer.

Figure 3:
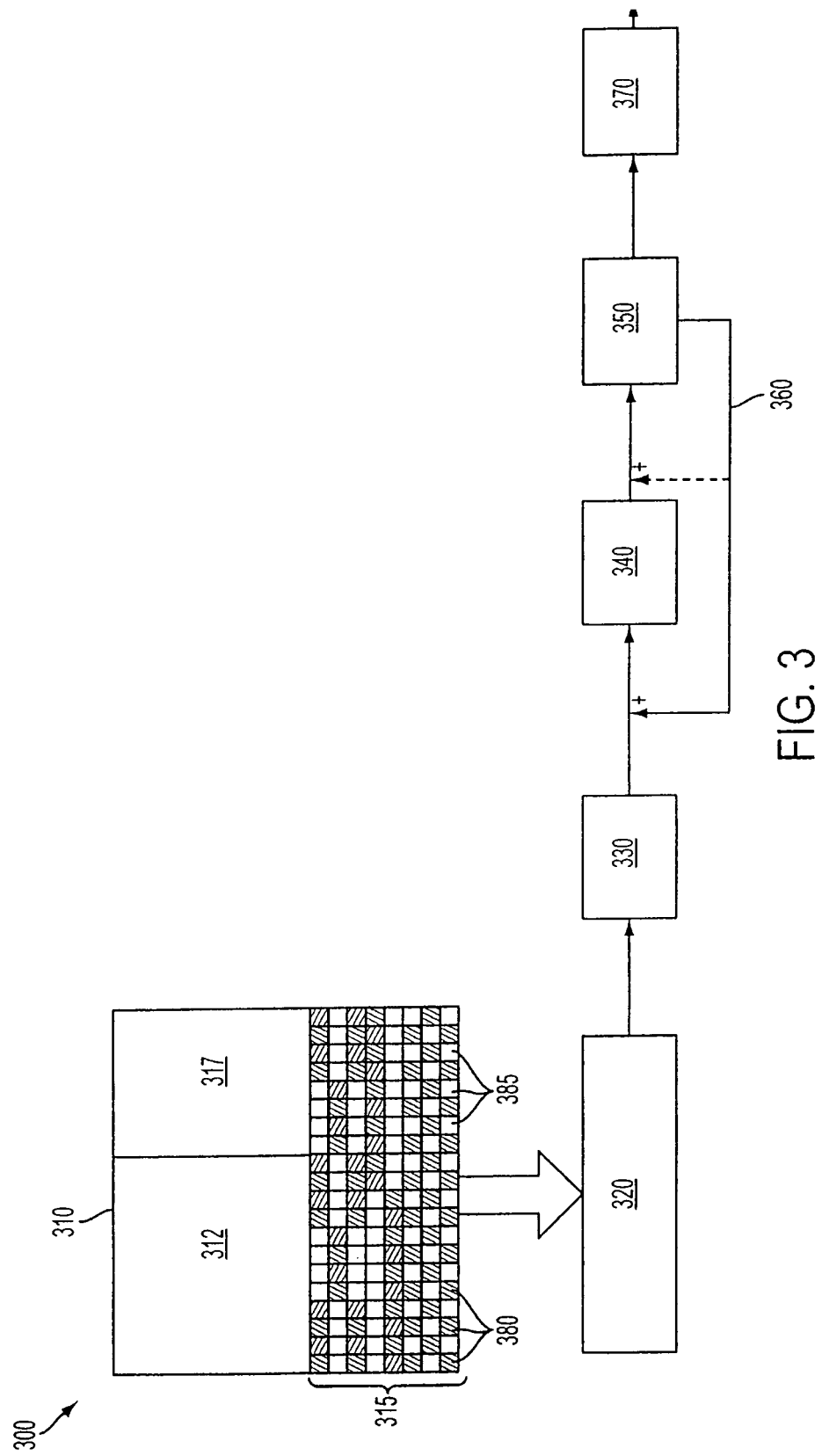
FIG. 3 is an image sensor according to another exemplary embodiment of the invention.

In an improved exemplary embodiment of the invention, as demonstrated in FIG. 3, an image sensor 300 contains both optically black pixels 385 and tied pixels 380 in each row of the dark rows 315 of a pixel array 310. As depicted in FIG. 3, image sensor 300 also includes a set of holding capacitors 320, an analog signal processing block 330, a set of analog-to-digital converters 340, a set of read-out buffers 370, a black level correction circuit 350 and a feedback loop 360. The pixel array 310 includes an active area 312, dark rows 315 and dark columns 317. As indicated above, the output from both optically black pixels 385 and tied pixels 380 will vary and must be accounted for. However, in the improved embodiment of the invention, the difference between optically black and tied pixel output need not account for row-specific noise. All pixels on a row "see" the same row-specific noise, so values from tied pixels 380 can be compared with values from the optically black pixels 385 without the need for taking many row samples to suppress row-specific noise. In theory, a single dark row could be sufficient to generate an accurate black level value. The average output from tied pixels 380 in the row results in an initial black level value; the difference between the average tied pixel output and the average optically black pixel output in the same row results in an additional corrective value. Both the tied pixel value and the additional corrective value are calculated by the black level correction circuit 350 and are summed together to generate a result which is applied to succeeding pixel outputs (feedback loop 360), thus setting an accurate black level. In practice, a few dark rows may be necessary for both redundancy and to further refine the calculated black level.

The physical organization of tied pixels 380 and optically black pixels 370 of dark rows 315 can be a checkerboard pattern, with individual pixels alternating between optically black pixels 385 and tied pixels 380. Alternatively, dark rows 315 could be split in the middle, with optically black pixels 385 on one side of a row and tied pixels 380 on the other. In the event that rows are split, it is preferable to alternate the sides of the rows whereon the optically black pixels 385 and tied pixels 380 are located, so as to facilitate the averaging out of any noise artifacts arising from localized defects of the pixel array 310. Any other repetitive pattern of n consecutive tied pixels followed by n consecutive dark pixels could be used, where n is an integer greater than one but less than half the length of dark rows 315. In general, any symmetrical physical arrangement of tied pixels 380 and optically black pixels 385 of dark rows 315 is appropriate.

Figure 4:
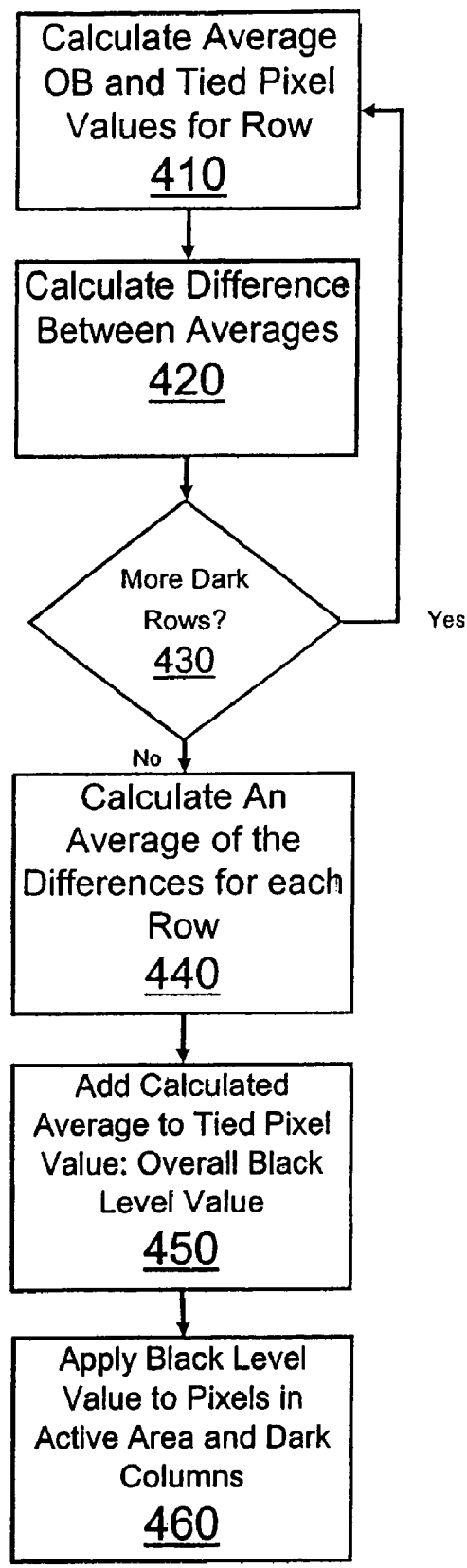
FIG. 4 shows the operations of a black level correction circuit according to an exemplary embodiment of the invention.

The operations of the black level correction circuit 350 are summarized in FIG. 4. As pixel values from the dark rows 315 are readout, the black level correction circuit 350 determines the average optically black pixel value and the average tied pixel value for each row in the dark rows 315 (block 410). For each row, the difference between the average optically black pixel value and the average tied pixel value is calculated (block 420). The processes of blocks 410 and 420 are repeated for each of the dark rows 315 (block 430). Once the difference between the average optically black pixel value and the average tied pixel value for each row is calculated, an average of the differences is calculated (block 440). The calculated average of the differences is summed with a tied pixel value to create an overall black level value (block 450). When pixel values from the active area 312 or dark columns 317 are readout, black level correction occurs by subtracting the overall black level value from the value of each pixel in the active area 312 and dark columns 317 (block 460).

The above-described embodiments of the invention are directed towards setting an appropriate black level by performing black level correction procedures on the analog pixel signal outputs of pixels in a pixel array. This analog black level correction is implemented by the black level correction circuits 250 and 350 and the feedback loops 260 and 360 (FIGS. 2 and 3). However, the black level correction procedures may also be applied on digital pixel signal outputs. In this case, the black level correction circuits 250 and 350 act as described, but the feedback loops 260 and 360 are used to adjust the frame-wise black level after the pixel output is digitized. By applying black level correction to digital pixel outputs using noise correction modules 250, 350, the black level correction may be implemented as either a hardware or a software solution. As a software solution, the black level correction may be implemented as either software integrated with the imagers 200, 300, or as a stand-alone software product stored on a carrier medium and installed on a computer system.

Figure 5:
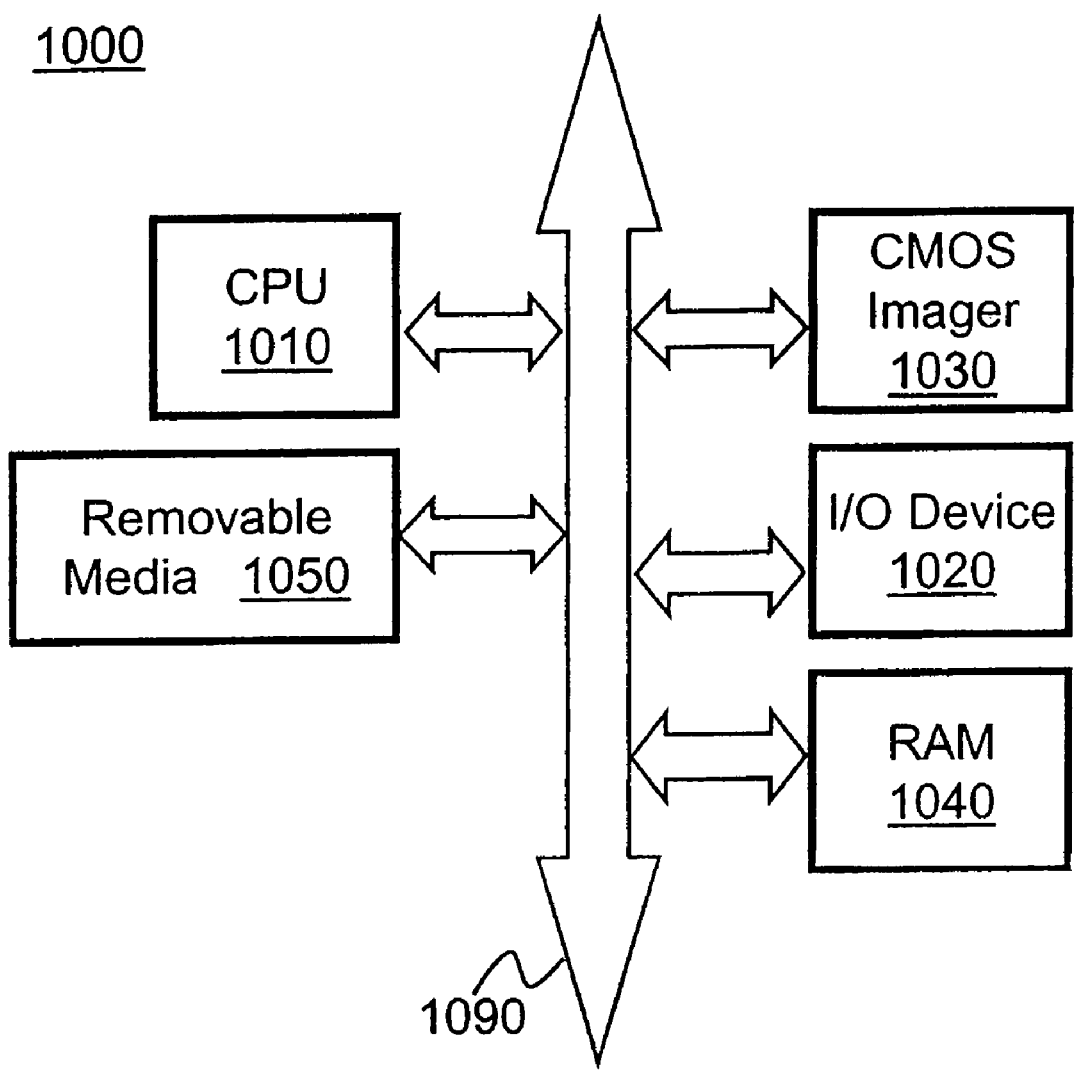
FIG. 5 is a processor based system that includes an image sensor according to an exemplary embodiment of the invention.

A typical processor based system 1000, which includes an imager device 1030 according to the present invention is illustrated in FIG. 5. A processor based system is exemplary of a system having digital circuits which could include imager devices. Without being limiting, such a system could include a computer system, camera system, scanner, machine vision system, vehicle navigation system, video telephone, surveillance system, auto focus system, star tracker system, motion detection system, or other image acquisition system.

A processor system, such as a camera system, for example, generally comprises a central processing unit (CPU) 1010, for example, a microprocessor, that communicates with an input/output (I/O) device 1020 over a bus 1090. The imager 1030 also communicates with the system components over bus 1090. The computer system 1000 also includes random access memory (RAM) 1040, and, in the case of an imaging system may include peripheral devices such as a removable memory 1050 which also communicates with CPU 1010 over the bus 1090. Imager 1030 is preferably constructed as an integrated circuit which includes pixels containing a photosensor, such as a photogate or photodiode. The imager 1030 may be combined with a processor, such as a CPU, digital signal processor or microprocessor, with or without memory storage in a single integrated circuit, or may be on a different chip than the processor.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

What is claimed as new and desired to be protected by Letters Patent of the United States is:

1. An imaging pixel array, comprising:
   an active area of pixels, organized as a plurality of rows and columns of pixels; and
   a plurality of dark pixels arranged in a plurality of dark pixel columns adjacent to a first side of said active area of pixels and in a plurality of dark pixel rows adjacent to a second side of said active area of pixels and to said plurality of dark pixel columns, the plurality of dark pixel rows having a width corresponding to a width of the active area of pixels and the plurality of dark pixel columns, wherein each row of the plurality of dark pixel rows includes a first half of only optically black pixels and a second half of only tied pixels.

2. The imaging pixel array of claim 1, wherein the optically black pixels and tied pixels in the plurality of dark pixel rows are organized in a checkerboard pattern.

3. The imaging pixel array of claim 1, wherein the first and the second halves of adjacent dark pixel rows are located on alternating sides of a vertical axis marking the midpoint of the dark rows.

4. The imaging pixel array of claim 1, wherein the optically black pixels and the tied pixels in the plurality of dark pixel rows are organized in a symmetrical pattern.

5. An imaging system, comprising:
an imager, comprising a pixel array, comprising:
an active area of pixels, comprising rows and columns of pixels; and
a plurality of dark pixels arranged in a plurality of dark pixel columns adjacent to a first side of said active area of pixels and in a plurality of dark pixel rows adjacent to a second side of said active area of pixels and to said plurality of dark pixel columns, the plurality of dark pixel rows having a width corresponding to a width of the active area of pixels and the plurality of dark pixel columns, wherein each row of the plurality of dark pixels comprises optically black pixels and tied pixels; and
a black level calculating module that calculates a black level correction value based on the outputs of an equal number of the optically black pixels and the tied pixels.

6. The system of claim 5, wherein the black level calculating module further comprises:
an averaging module to calculate an average optically black pixel output and an average tied pixel output for each row in the plurality of dark pixel rows;
a comparing module to determine a difference between the average optically black pixel output and the average tied pixel output for each row; and
a calculating module to calculate the black level correction value as an average of the determined differences.

7. The system of claim 5, wherein the optically black pixels and tied pixels in the plurality of dark pixel rows are organized in a checkerboard pattern.

8. The system of claim 5, wherein each row of the plurality of dark pixel rows is organized into a first half and a second half, the first half comprising optically black pixels, and the second half comprising tied pixels.

9. The system of claim 8, wherein the first and the second halves of pixels are located on alternating sides of adjacent dark pixel rows.

10. The system of claim 5, wherein the optically black pixels and the tied pixels in the plurality of dark pixel rows are organized in a symmetrical pattern.

11. An imaging pixel array, comprising:
an active area of pixels, organized as a plurality of rows and columns of pixels; and
a plurality of dark pixels arranged in a plurality of dark pixel columns adjacent to a first side of said active area of pixels and in a plurality of dark pixel rows adjacent to a second side of said active area of pixels and to said plurality of dark pixel columns, the plurality of dark pixel rows having a width corresponding to a width of the active area of pixels and the plurality of dark pixels columns, approximately half of said plurality of dark pixels in said dark pixel rows comprising optically black pixels and approximately half of said plurality of dark pixels in said dark pixel rows comprising tied pixels, wherein the dark pixel rows comprise optically black pixels and tied pixels arranged in a checkerboard pattern.

* * * * *